United States Patent
Hammarwall et al.

(10) Patent No.: US 9,467,211 B2
(45) Date of Patent: Oct. 11, 2016

(54) INDUCED INCOHERENCY FOR JOINT TRANSMISSION

(75) Inventors: David Hammarwall, Vallentuna (SE); Svante Bergman, Hägersten (SE)

(73) Assignee: TELEFONATIEBOLAGET L M ERICSSON, Stockholm (SE)

(*) Notice: Subject to any disclaimer, the term of this patent is extended or adjusted under 35 U.S.C. 154(b) by 689 days.

(21) Appl. No.: 13/577,467

(22) PCT Filed: Jun. 15, 2012

(86) PCT No.: PCT/SE2012/050653
§ 371 (c)(1),
(2), (4) Date: Aug. 7, 2012

(87) PCT Pub. No.: WO2013/137793
PCT Pub. Date: Sep. 19, 2013

(65) Prior Publication Data
US 2013/0242769 A1 Sep. 19, 2013

Related U.S. Application Data

(60) Provisional application No. 61/611,316, filed on Mar. 15, 2012, provisional application No. 61/612,756, filed on Mar. 19, 2012.

(30) Foreign Application Priority Data

Jun. 7, 2012 (WO) .................. PCT/SE2012/050609

(51) Int. Cl.
*H04B 7/02* (2006.01)
*H04L 5/00* (2006.01)
(Continued)

(52) U.S. Cl.
CPC ........... *H04B 7/024* (2013.01); *H04J 11/0053* (2013.01); *H04J 13/004* (2013.01);
(Continued)

(58) Field of Classification Search
None
See application file for complete search history.

(56) References Cited

U.S. PATENT DOCUMENTS

2012/0275507 A1* 11/2012 Roman et al. ................. 375/226
2012/0287799 A1* 11/2012 Chen et al. .................... 370/252
(Continued)

FOREIGN PATENT DOCUMENTS

EP       2448142 A2    5/2012
WO    2010/151069 A2  12/2010

OTHER PUBLICATIONS

3rd Generation Partnership Project. 3GPP TS 36.213 V10.1.0 (Mar. 2011). 3rd Generation Partnership Project; Technical Specification Group Radio Access Network; Evolved Universal Terrestrial Radio Access (E-UTRA); Physical layer procedures (Release 10). Mar. 2011.

(Continued)

*Primary Examiner* — Marcus R Smith
(74) *Attorney, Agent, or Firm* — Patents on Demand, P.A.; Brian K. Buchheit; Scott M. Garrett (57) ABSTRACT

Frequency-selective phase shifts are applied to signals transmitted from multiple transmission points involved in a coordinated (joint) transmission to a given UE. An eNodeB or other network node controlling the joint transmission artificially induces frequency selectivity between signals received by the UE in joint transmission from different transmission points, so as to ensure an even balance between constructive and destructive combination over frequency. By applying frequency-selective phase shifts (e.g., pseudo-random phase shifts) to the different transmission points that perform joint transmission, the signals from the different transmission points are forced to combine at the UE in a non-coherent manner. As a result, uncertainty in how the signals combine is drastically reduced, since it can be expected that the signals will always combine incoherently. The reduced uncertainty translates to reduced back-off offset in the link adaptation, and thus in an increased throughput.

12 Claims, 3 Drawing Sheets

(51) Int. Cl.
*H04J 11/00* (2006.01)
*H04J 13/00* (2011.01)
*H04W 72/12* (2009.01)
*H04B 7/06* (2006.01)

(52) U.S. Cl.
CPC .......... *H04L5/0016* (2013.01); *H04L 5/0035* (2013.01); *H04B 7/063* (2013.01); *H04B 7/0639* (2013.01); *H04B 7/0676* (2013.01); *H04B 7/0682* (2013.01)

(56) References Cited

U.S. PATENT DOCUMENTS

2013/0003788 A1* 1/2013 Marinier et al. .............. 375/219
2013/0114656 A1* 5/2013 Sayana ................. H04B 7/024
  375/219
2013/0294352 A1* 11/2013 Park et al. .................... 370/328
2013/0344909 A1* 12/2013 Davydov ............. H04B 7/0689
  455/501

OTHER PUBLICATIONS

3rd Generation Partnership Project. "Comparison of CSI Feedback Schemes." 3GPP TSG-RAN WG1 Meeting #58, R1-093778, Miyazaki, Japan, Oct. 12-16, 2009.

3rd Generation Partnership Project. "Feedback Operation for Coordinated Multi-point Operation." 3GPP TSG-RAN WG1 Meeting #67, R1-113892, San Francisco, USA, Nov. 14-18, 2011.

3rd Generation Partnership Project. "On Aggregated CoMP Feedback." 3GPP TSG-RAN WG1 Meeting #68, R1-120374, Dresden, Germany, Feb. 6-10, 2012.

* cited by examiner

INDUCED INCOHERENCY FOR JOINT TRANSMISSION

TECHNICAL FIELD

The present invention generally relates to wireless communications networks, and more particularly relates to techniques for coordinated multipoint transmission of radio signals to mobile terminals.

BACKGROUND

Standards for the Long-Term Evolution (LTE) wireless network have been developed by members of the $3^{rd}$-Generation Partnership Project (3GPP). The members of 3GPP are currently developing the Release 11 specifications for LTE. These developing standards will include specifications for yet another technology for extending high throughput coverage, namely improved support for Coordinated Multipoint (CoMP) transmission/reception, where multiple nodes coordinate transmissions and receptions to increase received signal quality and reduce interference.

CoMP transmission and reception refers to techniques used in a wireless communication system in which the transmission and/or reception at multiple, geographically separated antenna sites is coordinated, to improve system performance. More specifically, the term CoMP refers to the coordination of antenna arrays that have different geographical coverage areas. In the discussion that follows, an antenna or group of antennas covering a certain geographical area is referred to as a point, or more specifically as a Transmission Point (TP). The coordination and control of multiple transmission points can either be distributed, by means of direct communication between the different sites, or by means of a central coordinating node.

CoMP has been introduced into LTE to improve the coverage of high-data-rate services, to increase cell-edge throughput, and/or to increase system throughput. In particular, the goal is to distribute the user-perceived performance more evenly in the network by taking better control of the interference. CoMP operation targets many different deployments, including coordination between sites and sectors in cellular macro deployments, as well as coordination in various configurations of heterogeneous deployments, where, for instance, a macro node coordinates its transmission with pico nodes within the macro coverage area.

There are many different CoMP transmission schemes that are being considered and/or developed. For example, one approach is called Dynamic Point Blanking, where multiple transmission points coordinate transmissions so that a neighboring transmission point may mute transmissions on the specific time-frequency resources that are allocated to mobile terminals ("UEs," in 3GPP parlance) and that are experiencing significant interference. Another approach is called Dynamic Point Selection, where the data transmission to a UE may switch dynamically (in time and frequency) between different transmission points, so that the transmission points are fully utilized. In another approach, Coordinated Beamforming, the transmission points coordinate transmissions in the spatial domain by beaming the transmission power in such a way that the interference to UEs served by neighboring transmission points is suppressed. With Joint Transmission, a given transmission to a UE is simultaneously transmitted from multiple transmission points, using the same time-frequency resources.

One common denominator for the various CoMP transmission schemes is that the network needs channel-state information (CSI) not only for the serving transmission point, but also for the radio channels linking neighboring transmission points to a mobile terminal. For that purpose the CoMP Measurement Set is introduced in LTE. The underlying basis of the CoMP Measurement Set is a new reference symbol sequence, the CSI-RS, which was introduced in LTE Release-10 specifications for the express purpose of estimating channel state information. The CoMP Measurement Set enables the eNodeB to configure a set of CSI-RS resources that the UE will use to perform channel measurements for providing CSI feedback to the network. A CSI-RS resource, which generally corresponds to a particular transmission point, can loosely be described as a pattern of time-frequency resource elements on which a particular CSI-RS configuration is transmitted. A CSI-RS resource is determined by a combination of the LTE parameters "resourceConfig", "subframeConfig", and "antennaPortsCount", which are configured by Radio Resource Control (RRC) signaling.

For LTE, 3GPP has adopted an implicit CSI mechanism for CSI feedback. With this approach, a UE does not explicitly report the complex valued elements of a measured effective channel, for example, but instead recommends a transmission configuration for the measured effective channel. The recommended transmission configuration thus implicitly gives information about the underlying channel state.

In Release 8 and 9 of LTE the CSI feedback is given in terms of a transmission rank indicator (RI), a pre coder matrix indicator (PMI), and channel quality indicator(s) (CQI). The CQI/RI/PMI report can be wideband or frequency selective depending on which reporting mode that is configured. The RI corresponds to a recommended number of streams that are to be spatially multiplexed and thus transmitted in parallel over the effective channel. The PMI identifies a recommended precoder (in a codebook) for the transmission, which relates to the spatial characteristics of the effective channel. The CQI represents a recommended transport block size (i.e., code rate). There is thus a relation between a reported CQI and a signal-to-interference-plus-noise ratio (SINR) of the spatial stream(s) over which the transport block is transmitted. It will be appreciated that in some contexts a CQI is understood to refer to a SINR or a similar received signal quality metric, but that is not the proper definition in LTE contexts. Most notably, reporting an SINR corresponds to the category of explicit CSI, whereas CQI as defined above fall in the implicit CSI category.

The implicit feedback framework has many advantages over more explicit feedback. Most notably, the UE implementation becomes to a large extent transparent to the reporting mechanism and the testing thereof. Further, the implicit feedback framework encourages advanced or particularly effective receiver implementation, since high-performing UEs can report higher CQI and/or higher transmission rank and thus immediately benefit from the added implementation effort. Advanced receiver designs may include, for example, the use of an increased number of UE receive antennas, advanced interference suppression techniques, and/or advanced channel estimation for demodulation and CSI reporting.

Explicit CSI feedback, on the other hand, has the disadvantage that possible benefits from the reporting UE's receiver implementation are typically not reflected in the reporting, and it therefore becomes increasingly difficult for the network and UE to manage and fully exploit different UE receiver implementations. Moreover, it is generally more difficult to provide effective interoperability testing for such CSI feedback mechanisms.

The use of CSI-RS for CSI reporting provides several advantages over basing the CSI feedback on the common reference symbols (CRS), which were used for that purpose in previous releases. First, the CSI-RS is not used for demodulation of the data signal, and thus does not require the same density. In other words, the overhead consumed by CSI-RS is substantially less than is required by reference signals that are used to provide a reference for signal demodulation. Second, CSI-RS provides a much more flexible means to configure CSI feedback measurements, in that which CSI-RS resource to measure on can be configured in a UE-specific manner. Third, CSI-RS can be used to generate CSI feedback for more than four antennas. In fact, the support of antenna configurations larger than 4 antennas must resort to CSI-RS, since CRS are only defined for at most 4 antennas.

Related to CSI-RS is the concept of zero-power CSI-RS resources, which are also known as muted CSI-RS. These are identified to the mobile terminal (i.e., "configured") in the same way that regular CSI-RS resources are configured. A UE thus knows that data transmissions are mapped around both the zero-power CSI-RS resources and any CSI-RS resources configured for measurement. The intent of the zero-power CSI-RS resources is to enable the network to mute the transmission on the corresponding time-frequency resources so as to boost the SINR of a corresponding non-zero power CSI-RS, which might be transmitted, for example, from a neighbor cell and/or transmission point.

For Release 11 of LTE, a special zero-power CSI-RS that a UE is mandated to use for measuring interference-plus-noise is under discussion. As the name indicates, a UE can assume that the transmission points of interest are not transmitting on the muted CSI-RS resource and the received power can therefore be used as a measure of the interference-plus-noise level.

Based on a specified CSI-RS resource and an interference measurement configuration (e.g., a muted CSI-RS resource), the UE can estimate the effective channel and interference-plus-noise, and consequently also determine which rank, precoder and transport format to recommend that best match the particular channel.

As noted above, to support CoMP transmission the network needs CSI information not only for the serving transmission point but also for the channels linking the neighboring transmission point to a mobile terminal of interest. By configuring a unique CSI-RS resource per transmission point, for example, a UE can resolve the effective channels for each transmission point by measurements on the CSI-RS corresponding to that transmission point. Note that the UE is generally unaware of the physical presence of a particular transmission point; it is only configured to measure on a particular CSI-RS resource, without knowing of any association between the CSI-RS resource and a particular transmission point.

A few candidates for CoMP feedback techniques are on the table for LTE Release 11 specifications. Most alternatives are based on per CSI-RS resource feedback, possibly with CQI aggregation of multiple CSI-RS resources, and also possibly with some sort of co-phasing information between CSI-RS resources. The following list briefly introduces a few relevant alternatives. Note that a combination of one or more of these alternatives is also possible.

Per-CSI-RS resource feedback corresponds to separate reporting of channel state information (CSI) for each CSI-RS of a set of CSI-RS resources. Such a CSI report could, for example, correspond to a Precoder Matrix Indicator (PMI), a Rank Indicator (RI), and/or a Channel Quality Indicator (CQI), any or all of which represent a recommended configuration for a hypothetical downlink transmission over the same antennas used for the associated CSI-RS (or other RS used for the channel measurement). More generally, the recommended transmission configuration should be mapped to physical antennas in the same way as the reference symbols used for the CSI channel measurement. There could be interdependencies between the CSI reports sent according to the per-CSI-RS resource feedback approach; for example, they could be constrained to have the same RI.

The considered CSI-RS resources are configured by the eNodeB as the CoMP Measurement Set. Often there is a one-to-one mapping between a CSI-RS and a transmission point, in which case per-CSI-RS resource feedback corresponds to per-transmission point feedback; that is, a separate PMI/RI/CQI is reported for each TP.

Aggregate feedback corresponds to a CSI report for a composite channel that corresponds to an aggregation of multiple CSI-RS. For example, a joint PMI/RI/CQI can be recommended for a joint transmission over all antennas associated with the multiple CSI-RS. However, a joint search may be too computationally demanding for the UE, and a simplified form of aggregation is to evaluate an aggregate CQI and RI, which are combined with per-CSI-RS resource PMIs. Such a scheme also has the advantage that the aggregated feedback may share much information with a per-CSI-RS resource feedback. This is beneficial because many CoMP transmission schemes require per-CSI-RS resource feedback, and to enable eNodeB flexibility in dynamically selecting CoMP scheme, aggregated feedback would typically be transmitted in parallel with per0 CSI-RS resource feedback. To support coherent joint transmission, such per-CSI-RS resource PMIs can be augmented with co-phasing information enabling the eNodeB to rotate the per-CSI-RS resource PMIs so that the signals coherently combine at the receiver.

CoMP schemes under consideration employ downlink transmission using UE-specific demodulation reference symbols (DMRS), which were introduced in LTE release 9. The DMRS are transmitted intertwined with the data symbols and are subject to the same precoding, so as to make non-codebook-based precoding possible. In order to facilitate processing gains in the channel estimation, it is important to keep the precoder fixed for some interval in the frequency domain as well as in temporal domain. Furthermore the UE needs to be aware where these constant precoding intervals are located. For transmission mode 9 in LTE, these intervals are termed precoding resource block groups (PRG), and the resource blocks within a PRG are subject to physical resource block (PRB) bundling.

Based on feedback reports received from UEs in its coverage area, the LTE base station, known in 3GPP terminology as an evolved NodeB or eNodeB, needs to schedule the UEs in the resource time-frequency grid, coordinate the transmission points that are under the eNodeB's control, and perform link adaptation for each scheduled link. The link adaptation takes the feedback from the UEs into account, but it is common practice to adjust the reported CQI in order to compensate for imperfections in the feedback, uncertainties regarding interference measurements, etc.

Typically there is a UE-specific and dynamically adjusted back-off to the CQI that is applied when the eNodeB performs link adaptation. This means that if there are systematic errors or unpredictable uncertainties in the feedback CQI, the eNodeB must increase its back-off so that a target block error rate (BLER) is met. Because uncertainties translate to losses in system throughput, techniques for reducing these uncertainties are desirable.

SUMMARY

In several embodiments of the present invention, frequency-selective phase shifts are applied to signals transmitted from multiple transmission points involved in a coordinated (joint) transmission to a given UE. In some embodiments, an eNodeB or other network node controlling the joint transmission artificially induces frequency selectivity between signals received by the UE in joint transmission from different transmission points, so as to ensure an even balance between constructive and destructive combination over frequency. By applying frequency-selective phase shifts (e.g., pseudo-random phase shifts) to the different transmission points that perform joint transmission, the signals from the different transmission points are forced to combine at the UE in a non-coherent manner. As a result, uncertainty in how the signals combine is drastically reduced, since it can be expected that the signals will always combine incoherently. The reduced uncertainty that the induced transmission-point-specific frequency-selective phase offsets brings translates to reduced back-off offset in the link adaptation, and thus in an increased throughput.

Example embodiments of the present invention include methods implemented by one or more radio base stations, e.g., LTE eNodeBs, or other fixed nodes in a wireless network. In one example of such a method, an eNodeB acquires per-transmission point CSI feedback for several transmission points, from a UE of interest. Next, the eNodeB performs link adaptation for a CoMP transmission, i.e., determining transmission parameters for the joint transmission, based on an assumption that the signals from the several transmission points involved in the CoMP transmission will combine in a non-coherent fashion at the UE. Finally, the eNodeB transmits data from the multiple transmission points to the UE, according to the determined transmission parameters, but with induced frequency selectivity applied per each involved transmission point, so as to make the signals combine non-coherently at the UE.

In some embodiments, the induced frequency selectivity is applied by determining a plurality of phase shifts to be applied to the joint transmission, wherein the phase shifts vary from one transmission point to another as well as from one time-frequency resource or group of time-frequency resources to another. Thus, for example, the phase shift associated with a given PRG and transmission point (TP) may be given by an expression that takes the form: $\phi(PRG, TP)$. The granularity of the phase shift changes may be at the level of a single LTE resource block group (PRG), for example, or other set of physical resource blocks, or even a single physical resource block.

In some embodiments, the phase shifts to be applied to each resource group and transmission point are determined from a random or pseudo-random function. For example, the phase shift associated with a given PRG and transmission point may be given by the expression: $\phi(PRG,TP)=2\pi \cdot RAND(PRG,TP)$. Of course, other functions for generating random or pseudo-random phases may be used.

In several embodiments, a deterministic set of phase shifts is applied, to maximize the incoherency observed at the target UE. For instance, in some embodiments, the phase shifts are based on the arguments from a set of orthogonal sequences of complex valued scalars $\Psi_k(n)$, $n=0, \ldots, N-1$, where k denotes the sequence number and n the element within the sequence. In some of these embodiments, a different sequence is used for each transmission point involved in a coordinated transmission. In others, one or more sequences may be shared among two or more transmission points. In some of these latter embodiments, the one or more shared sequences are assigned to transmission points having or expected to have weaker signals at the UE of interest.

In other embodiments, the phase shifts applied to a given transmission point and resource group are determined by combining a random or pseudo-random phase shift with a deterministically determined phase shift, such as a phase shift derived from a sequence as described above. Thus, for example, the phase shift associated with a given PRG and transmission point may be given by the expression: $\phi(PRG, TP)=2\pi \cdot RAND(\lfloor PRG/N \rfloor,TP)+\arg(\Psi_{TP}(PRG \mod N))$. With this approach, there will be a TP-specific random phase shift for each subband consisting of N PRGs, added to a sequence of phase shifts for PRGs within the subband. The result is that phase changes within each subband can be structured to maximize their separations, while at the same a random or pseudo-random phase shift is introduced between subbands, to break repetitive patterns resulting from the sequence-based phase shifts within each subband.

In several embodiments, the phase shift applied to transmissions from the strongest transmission point is set to zero for the entire bandwidth, with a highly frequency-selective phase shift applied to transmissions from one or more other coordinated transmission points.

With the induced incoherency provided by any of the above techniques, the eNodeB can assume that the signals received at the UE are combined incoherently, and can perform link adaptation accordingly. In several embodiments of the invention, one or more of the above techniques are combined with a technique for determining a signal-to-interference-plus-noise ratio (SINR) that assumes incoherent joint transmission. In some embodiments, the eNodeB approximates an effective SINR by simply summing per-point SINRs obtained for each of two or more coordinated transmission points. In other embodiments, an effective SINR is stochastically modeled. For example, the expression $SINR_q = \|\sqrt{SINR_{q,1}}e^{j\Phi_{q,1}}+\sqrt{SINR_{q,2}}e^{j\Phi_{q,2}}+ \ldots + \sqrt{SINR_{q,N}}e^{j\Phi_{q,M}}\|^2$ may be used, where $SINR_q$ is a random variable that describes the SINR of PRG q and $SINR_{q,i}$ is the estimated per-point SINR of PRG q on the i-th transmission point that is involved in the joint transmission.

Base station or other network node apparatus adapted to carry out any of the techniques summarized above, and variants thereof, are also disclosed in the detailed discussion that follows. Of course, the present invention is not limited to the above-summarized features and advantages. Indeed, those skilled in the art will recognize additional features and advantages upon reading the following detailed description, and upon viewing the accompanying drawings.

DETAILED DESCRIPTION

Note that although terminology from 3GPP LTE has been used in this disclosure to exemplify the invention, this should not be seen as limiting the scope of the invention to only the aforementioned system. Other wireless systems, including WCDMA, WiMax, UMB and GSM, may also benefit from exploiting the ideas covered within this disclosure.

Also note that terminology such as eNodeB and UE should be considering non-limiting and is not meant to imply that the invention disclosed herein is limited to implementation in devices having an identical hierarchical relation; in general "eNodeB" can be considered as device 1, where device 1 has direct or indirect control of multiple transmission points, and "UE" can be considered as device 2, a device targeted by transmissions from one or more of the multiple transmission points controlled by device 1.

Figure 1:
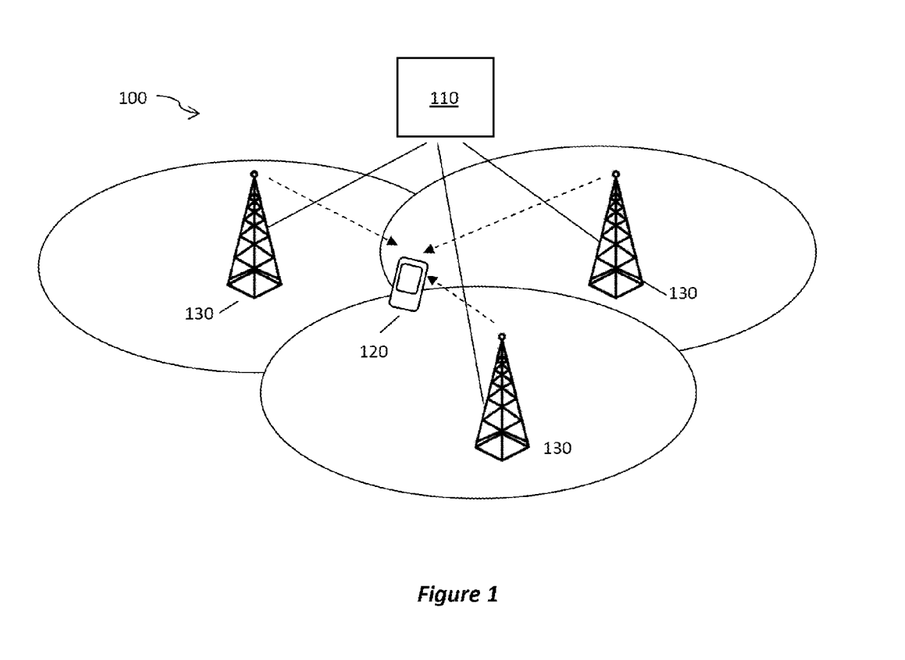
FIG. 1 is a schematic diagram illustrating a portion of an example network configuration in which the techniques disclosed herein may be implemented.

FIG. 1 illustrates a portion of an example wireless communications system in which the techniques described herein may be implemented. System 100 includes an eNodeB 110, which controls three distinct remote radio units (RRUs) 130. eNodeB 110 controls transmissions to one or more UEs 120 from RRUs 130, and may use one or more of the CoMP techniques described earlier, or one or more variants thereof. Thus, each of the UEs 120 may receive transmissions from one or several of the RRUs 130, at the same time or in a time-coordinated fashion. Of course, the system diagram of FIG. 1 illustrates only one possible configuration for a system engaged in a CoMP transmission; the techniques described below can be applied to other configurations as well.

When performing joint transmission it is important that the eNodeB can accurately derive an effective CQI (modulation and coding) for the transmission, based on the feedback information made available by a UE. If the UE feeds back per-point CSI, the network must derive a corresponding joint CQI (i.e., an aggregate CQI) from the reported per-CSI-RS resource CQIs.

However, without precise information about timing misalignments and/or other frequency-selective phase differences between transmission points, it is difficult for the eNodeB to accurately combine the CQI measurements into an effective aggregate CQI, since it is unknown on which frequencies that signals add constructively or destructively, respectively. More specifically, the fraction of the reception (over frequency) that is received in constructive combining, relative to destructive combining, is unknown to the eNodeB. This uncertainty translates into an increased back-off in the link adaptation, effectively reducing the performance compared to a situation where the coherency is known, since the eNodeB must generally assume the worst case scenario to meet a block error rate (BLER) target. That is, the probability that a significant fraction of the reception (over frequency) is received in destructive combining likely substantially exceeds the BLER target.

One approach to remedy this problem is to configure the UE to compute an aggregate CQI for a coherent transmission, since the UE directly observes the frequency-selective constructive and destructive interference. However, this comes at the cost of a need for separate joint-transmission hypotheses on top of the per-point hypotheses that are needed for other CoMP schemes such as DPS and DBS, and may also require inter-CSI-RS resource phase recommendations. Aggregate CQI for coherent joint transmission is further sensitive to calibration errors, synchronization errors and feedback delay; that is, the inter-CSI-RS resource phase information assumed when evaluating the CQI may be outdated when the actual transmission occurs.

A different approach is used in several embodiments of the present invention. With this approach, the eNodeB artificially induces frequency selectivity between signals received by the UE in joint transmission from different transmission points (i.e., signals transmitted along different CSI-RS resource virtualizations), so as to ensure an even balance between constructive and destructive combination over frequency. By applying frequency-selective phase shifts (e.g., pseudo-random phase shifts) to the different transmission points that perform joint transmission, the signals from the different transmission points are forced to combine at the UE in a non-coherent manner. As a result, the uncertainty in how the signals combine is drastically reduced, since it can be expected that the signals will always combine incoherently.

This stands in contrast to the case when there is little selectivity in the phase difference between points, where the signals from the two or more transmission points combine coherently but sometimes in a destructive manner. However, since the same phase shift is applied to all antennas within a particular transmission point, the signals originating from a single transmission point may be coherently combined by, for example following the per-CSI-RS resource PMI feedback recommendation from the UE.

Figure 2:
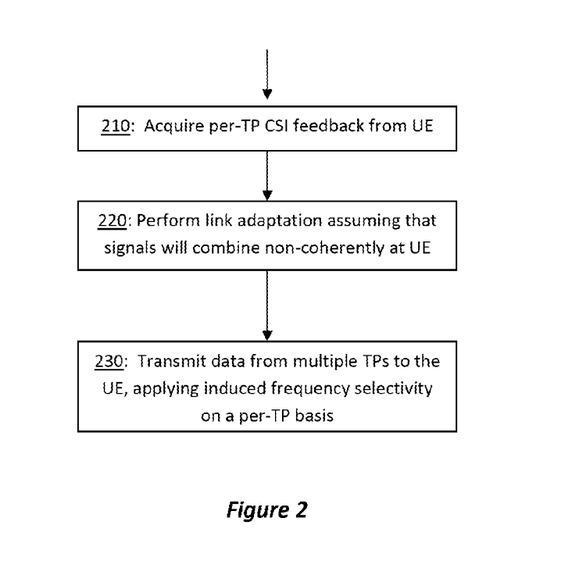
FIG. 2 is a process flow diagram illustrating an example method for participating in a coordinated multipoint transmission to a user equipment.

The reduced uncertainty resulting from the induced transmission-point-specific frequency-selective phase offsets translates to reduced back-off offset in the link adaptation, and thus in an increased throughput. A general method according to several embodiments of the invention is shown in FIG. 2. This method might be implemented by a radio base station, e.g., an LTE eNodeB, or other fixed node in a wireless network, or by one or more such nodes. As shown at block 210, an eNodeB or other node acquires per-transmission point CSI feedback for several transmission points, from a UE of interest. Next, as shown in block 220, the node performs link adaptation for a CoMP transmission, i.e., adjusting power levels and the like, based on an assumption that the signals from the several transmission points involved in the CoMP transmission will combine in a non-coherent fashion at the UE. Finally, as shown at block 230, the eNodeB transmits data from the multiple transmission points to the UE, according to the link adaptation calculations, but with induced frequency selectivity applied per each involved transmission point, so as to make the signals combine non-coherently at the UE.

The frequency-selective phase shifts between the transmission point transmissions may be applied in a random or pseudo-random manner, or carefully planned (deterministically) to maximize the incoherency between transmission points. Moreover, a combination of deterministic and random or pseudo-random phase shifts may be used. In transmission modes that rely on DMRS, the transmission point-specific phase shifts can be implemented without affecting the processing in the UE, since the DMRS will experience the same phase shifts as the signal.

In the discussion that follows, several aspects of the invention will be illustrated in more detail by a number of exemplary embodiments. It should be noted that these embodiments are not mutually exclusive. Components from one embodiment may be tacitly assumed to be present in another embodiment and it will be obvious to a person skilled in the art how those components may be used in the other exemplary embodiments.

In several embodiments of the invention the eNodeB or other node receives, at least, per-point CSI feedback from a UE. In a subsequent joint transmission to said UE, the eNodeB applies frequency-selective phase shifts per transmission point on signals that are part of the joint transmission.

In some systems and/or transmission modes, the granularity (in frequency) of the applied phase shifts is constrained. That is, the phase may be constrained to be static within segments of the bandwidth. For example, in LTE transmission mode 9, the precoding (phase shifts) is required to be static within a given resource-block group (PRG). However, an artificial frequency selectivity can be induced by applying phase shifts on a per-PRG granularity. (Note that while the following discussion will generally refer to PRGs, the size of the PRG may be one PRB. More generally, the techniques may be applied to any convenient unit of time-frequency resource.) Of course, the phase shift need not change between every adjacent PRG; applying phase shifts on a per-PRG granularity means that while phase shifts within every PRG are constant, the phase shifts vary among at least some of the PRGs.

For example, the transmission point-specific frequency-selective phase shift that is applied in a downlink data transmission can be expressed as a function:

$\phi(PRG,TP)$, which associates a phase shift (in radians) to a given PRG and transmission point (TP). In any given function the PRGs can, for example, be indexed increasingly over the full system bandwidth (i.e., independently of the UE allocation), or increasingly within the UE allocation (i.e., only PRGs allocated to a UE are indexed).

The applied phase shifts in frequency may be generated using random, pseudo-random, or deterministic sequences, or combinations thereof. Examples of each approach are presented in detail below. The eNodeB creates joint transmission hypotheses from the per-CSI-RS resource hypotheses reported by the UE. By assuming that the transmitted signals combine in an incoherent manner, the eNodeB can perform link adaptation with a high degree of accuracy as described in some of the following embodiments.

In one approach, pseudo-random TP-specific frequency-selective phase shifts are used. A pseudo-random sequence can be initialized using a seed that, for example, depends (but not necessarily exclusively) on the subframe index and a transmission point index. Here we define this sequence (mapped on to two dimensions) as RAND(n,m), where each index n and m results in a realization of a real valued number in the range [0,1), typically uniformly distributed within the range. Preferably, the realizations should have some degree of "randomness" between different indices.

In a simple form of this approach, the eNodeB applies the following frequency-selective phase shift to transmitted signals that constitute a joint transmission:

$\phi(PRG,TP)=2\pi \cdot RAND(PRG,TP)$, where PRG and TP are the resource block index and transmission point index respectively.

Another approach involves the use of deterministic phase shifts for maximized incoherency. With this approach, the incoherency is maximized by applying a pattern of phase shifts that ensures incoherent combination of signals from different transmission points. For example, such an implementation can be based on orthogonal sequences of complex-valued scalars:

$\Psi_k(n), n=0, \ldots, N-1$, where k denotes the sequence number and n the element within the sequence. The use of orthogonal sequences is particularly beneficial in the case when the natural phase variations between the links from the UE to strong transmission points are small. It is also beneficial if the sequences have elements of unit amplitude, since that will ensure that the orthogonality is fully induced by means of phase shifts, rather than from amplitude difference between elements.

Given the sequences of complex-valued scalars, a TP-specific phase sequence can be derived as follows, for example:

$\phi(PRG,TP)=arg(\Psi_{TP}(PRG \bmod N))$, where mod denotes the modulo operator (i.e., the remainder of the integer fraction PRG/N) and arg(*) denotes the argument/phase (in radians) of a complex scalar. One particularly suitable set of sequences satisfying the above premises are Discrete Fourier Transform rotations. That is, if $DFT_N$ is a size N×N DFT matrix, then $\Psi_k(n)$ can be derived from the elements of $DFT_N$ as:

$\Psi_k(n)=[DFT_N]_{k,n}$, where $[\bullet]_{k,n}$ denotes the element on position k, n of a matrix.

Note that at most N orthogonal sequences of length N can be formed; hence, with the above embodiment the length of the sequence should be larger than the number of transmission points that are participating in the joint transmission to a UE. However, there are reasons to avoid excessive lengths of the sequence.

For instance, the number of PRGs that are covered by one sequence should preferably not exceed the coherence bandwidth of the channel (i.e., the bandwidth over which the channel is essentially constant). Otherwise, maximized incoherent combination cannot be guaranteed. (On the other hand, narrow coherence bandwidths will reduce the need for planned incoherency since the natural frequency selectivity of the channel then will improve the incoherent combining.)

Often, eNodeB implementation divides the system bandwidth into subbands of consecutive PRBs (and consecutive PRGs), which form an entity for scheduling. For such implementations it is beneficial if the length of the orthogonal sequence is the same as the number of PRGs in the subband, or if the subband size, in PRGs, is an integer multiple of the sequence length. This will ensure that incoherent combination from different TPs is guaranteed for each subband independently.

In cases where the number of transmission points exceeds a desired sequence length, the same sequence may be reused by multiple transmission points. This has the implication that incoherent combination of signals from transmission points that share the same sequence cannot be guaranteed. To minimize the negative implications of such a reuse, the sequences should be assigned to transmission points so that the transmission points corresponding to the weakest received signals (i.e., the TPs associated with the smallest per-CSI-RS resource CQIs) should primarily share sequences, whereas the dominating TPs should have unique sequences. This approach ensures that the vast majority of the received power at the UE is received with guaranteed incoherent combination.

For example, a system having a subband size of six PRBs and a PRG size of two PRBs would benefit from having a sequence length of three. Each of the two dominating transmitting points could then be assigned its own unique sequence, while the remaining participating transmission points share the last sequence. In this way, the signals from the two dominating transmission points will have incoherent combination each other and with all other transmission points, whereas only signals among the weakest transmission points may experience destructive coherent combination.

A third approach utilizes both deterministic phase shifts for maximized incoherency and pseudo-random subband phase shifts. In this approach, the two approaches discussed above, which use random and planned patterns of phase shifts, respectively, are combined, to introduce a randomization between subbands of the signal combinations seen at the UE. This approach is particularly beneficial when there are more transmission points than a preferred sequence length, since some level of incoherence can also be induced among the transmission points that would share a sequence with the approach that uses only a limited set of orthogonal sequences.

With this approach, the applied phase shift can be calculated according to:

$$\phi(PRG,TP) = 2\pi \cdot RAND(\lfloor PRG/N \rfloor, TP) + \arg(\Psi_{TP}(PRG \mod N)).$$

The second term in this expression is identical to the phase shift given earlier for the deterministic approach, where phases from a TP-specific sequence are assigned to PRGs transmitted from that transmission point. The first term (which includes a "floor" function) introduces a random phase from one group of PRGs (e.g., a subband) to another. This phase remains the same within each group of N PRGs. Because the random (or pseudo-random) element is derived from a TP-specific index (e.g., a transmission point identifier TP), with such a construction there will be a TP-specific random phase shift for each subband, which ensures that neighboring subbands will combine differently even for TPs that share the same sequence. Note that the subband-specific phase shift can also be planned to induce maximum incoherence, reusing e.g., the DFT phase rotations along the same lines as discussed above.

In still another approach, pairs of maximum phase shifts for the non-strongest transmission points are used. In one example of this approach, the eNodeB sets the phase shift to zero in the entire bandwidth for the strongest transmission point, so as to simplify the design of phase shifts for the other transmission points. Another advantage is that the received signal then matches the received signal from a single-point transmission if the strongest point dominates.

When the phase shift is set to zero for the strongest point, it becomes beneficial to use a highly frequency-selective phase shift on the other transmission points to maximize the incoherency. One example of such a configuration is to use phase shift $\phi(PRG,TP)=0$, if TP is the index of the strongest transmission point, and, for the other transmission points, use a phase shift given by:

$$\varphi(PRG, TP) = \begin{cases} 2\pi \cdot RAND(\lfloor PRG/2 \rfloor, TP), & PRG \text{ is even} \\ 2\pi \cdot RAND(\lfloor PRG/2 \rfloor, TP) + \pi, & PRG \text{ is odd}. \end{cases}$$

Assuming the frequency selectivity of the strongest point is modest, the maximally separated pairs of PRGs ensure that there will be a high degree of incoherency between the strongest TP and the other TPs involved in the joint transmission. Moreover, the randomization between the pairs of PRGs will provide a random separation between all transmission points with at least a two-PRG periodicity.

Given the induced incoherency transmissions described above, the eNodeB can perform link adaptation and determine transmission parameters for the joint transmission with reduced uncertainty. For instance, assume the eNodeB has received multiple per-point CQI feedback reports from a UE that is a target for a joint transmission from several coordinated transmission points. Assume further that SINR values for the relevant per-point transmission hypotheses can be derived from the CQI reports (i.e., that the rank and assumptions on interference are compatible). Then, the eNodeB may approximate the effective SINR given an incoherent joint transmission from these points by the sum of the corresponding per-point SINRs.

Stochastically modeling of the link adaptation may also be performed. In one example, it is again assumed that the eNodeB has received multiple per-point CQI feedback reports from a UE that is a target for a joint transmission, and that relevant SINR values per point and PRG interval can be derived based on this feedback. We can formulate a stochastic model for the SINR per PRG given an incoherent joint transmission from these transmission points:

$$SINR_q = \|\sqrt{SINR_{q,1}}e^{j\phi_{q,1}} + \sqrt{SINR_{q,2}}e^{j\phi_{q,2}} + \ldots + \sqrt{SINR_{q,N}}e^{j\phi_{q,N}}\|^2,$$

where $SINR_q$ is a random variable that describes the SINR of PRG q and $SINR_{q,i}$ is the estimated per point SINR of PRG q on the i-th transmission point that is involved in the joint transmission. Note that typically the UE evaluates the CQIs over multiple PRGs, for which case the estimated per point SINRs are the same over the same ranges of PRGs. In LTE the feedback is provided with a minimum granularity that is referred to as a subband. The independent and uniformly distributed random variables $\phi_{q,i} \in [0, 2\pi)$ correspond to the random phase shifts between incoherent signals. A reparametrization yields $$SINR_q = \|\sqrt{SINR_{q,1}} + \sqrt{SINR_{q,2}}e^{j\phi'_{q,2}} + \ldots + \sqrt{SINR_{q,N}}e^{j\phi'_{q,N}}\|^2,$$

which is a model the eNodeB can use to perform link adaptation given that we employ induced incoherence transmissions. The performance will depend on the non-ordered set of SINRs per PRG corresponding to the bandwidth that is allocated to the UE. Because the order of the SINRs does not have a significant impact in the link adaptation, the non-ordered distribution of the SINRs will be substantially more predictable than the per PRG distribution. The non-ordered distribution corresponding to a subband will be particularly predictable, especially if the phases are planned so that there for example is one PRG with constructive combining, one intermediate, and yet another PRG with destructive combining.

In some cases the eNodeB may not be designed to handle link adaptation given random SINR values with this particular distribution. It is possible, however, to sample the distribution with an increasing number of realizations per subband until sufficiently good approximation is attained. This set of samples may then be used as regular input to the conventional link adaptation algorithm.

Another option for improving the link adaptation is to allow the UE to report an aggregated CQI (recommended transport block size) assuming an incoherent transmission between transmission points as described above. Hence, this incoherent aggregated CQI, which could be reported per subband or as a wideband report, provides a recommended link adaptation for the incoherent transmission. Since the assumed transmission is incoherent, the corresponding aggregate CQI will be robust to phase and frequency synchronization errors (as opposed to an aggregate CQI assuming a coherent transmission). Since the CQI assumes an incoherent transmission between transmission points, there is hence no need to feed back any inter CSI-RS resource phase feedback, which would be redundant for the recommended CQI.

Figure 3:
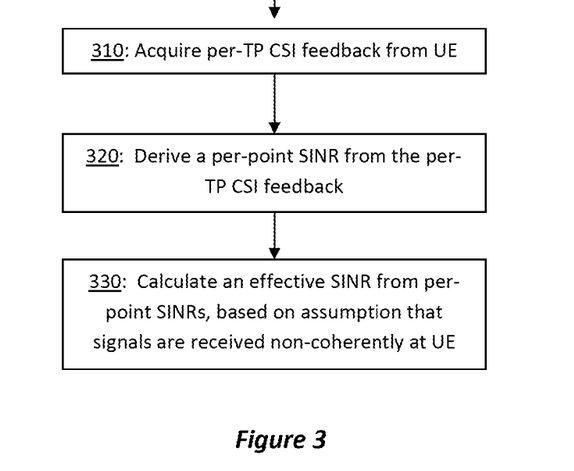
FIG. 3 is a process flow diagram illustrating an example method for determining an effective SINR for coordinated multipoint transmission.

FIG. 3 is a process flow diagram illustrating generally the techniques discussed above for calculating an effective SINR for a multipoint transmission, based on the assumption that the transmissions from the different transmission points are received incoherently. The illustrated technique can be combined with any of the techniques described above for inducing this incoherency, of course.

As shown at block 310, the eNodeB (or other node) acquires per-transmission point CSI feedback from the UE of interest. Next, as shown at block 320, the node derives a per-point SINR from the per-TP CSI feedback, using techniques that are well known. Finally, as shown at block 330, the node calculates an effective SINR from the per-point SINRs, based on the assumption that the signals are received incoherently at the UE. This assumption is valid, of course, if one or more of the earlier described techniques for inducing incoherency are used.

The several techniques described above can provide several advantages in various embodiments. First, given per-point CQI feedback, introducing induced frequency selectivity for joint transmissions allows the eNodeB to reduce its uncertainty regarding the coherency of the joint transmission. Reduced uncertainty on how the jointly transmitted signals combine leads to reduced need for backoff in the link adaptation, which in turn leads to a higher throughput. In other words, induced randomness in the transmission actually makes the link more stable. The potential loss that results from mixing constructive and destructive combining is in many cases less significant than the gain obtained from reducing the uncertainty in the link throughput.

The approaches that utilize pseudo-random TP-specific frequency-selective phase shifts can have particular advantages in some embodiments. These approaches provide a simple and robust solution to how to introduce induced incoherency in a joint transmission. The randomization ensures that all transmission points are well separated in terms of frequency selectivity with a high probability.

Approaches that utilize deterministic phase shifts for maximized incoherency can be implemented to maximize the incoherency within a predefined number of PRGs (typically a subband). Combining deterministic phase shifts for maximized incoherency with pseudo-random subband phase shifts introduces randomness between the maximally separated subbands. This will increase the separation between transmission points that share the same deterministic orthogonal sequence.

A common scenario is that the propagation channel between the UE and the strongest transmission point has a low degree of frequency selectivity. One approach discussed above, which utilizes pairs of maximum phase shifts for non-strongest transmission points, makes use of this fact to ensure that the phase shifts between the strongest point and the other points are highly selective in frequency. This will improve the efficiency of the system. Furthermore, this embodiment ensures that the transmission from the strongest point remains unaltered, so that if the strongest point dominates the received signal resembles the single point transmission.

Several of the techniques described above can be implemented in connection with a wireless base station, such as an eNodeB configured according to Release 11 specifications for LTE. In general, a base station communicates with access terminals and is referred to in various contexts as an access point, Node B, Evolved Node B (eNodeB or eNB) or some other terminology. Although the various base stations discussed herein are generally described and illustrated as though each base station is a single physical entity, those skilled in the art will recognize that various physical configurations are possible, including those in which the functional aspects discussed here are split between two or more physically separated units. In particular, it will be appreciated that some components involved in a Coordinated Multipoint Transmission, such as the antennas, are necessarily distributed across several geographically diverse sites. Other components, such as the power amplifiers, other radio circuits, and even some baseband processing circuitry may also be distributed across several sites. Thus, the term "base station" is used herein to refer to a collection of functional elements that controls transmissions to one or more mobile terminals, even though the base station may or may not be implemented as a single physical unit.

Figure 4:
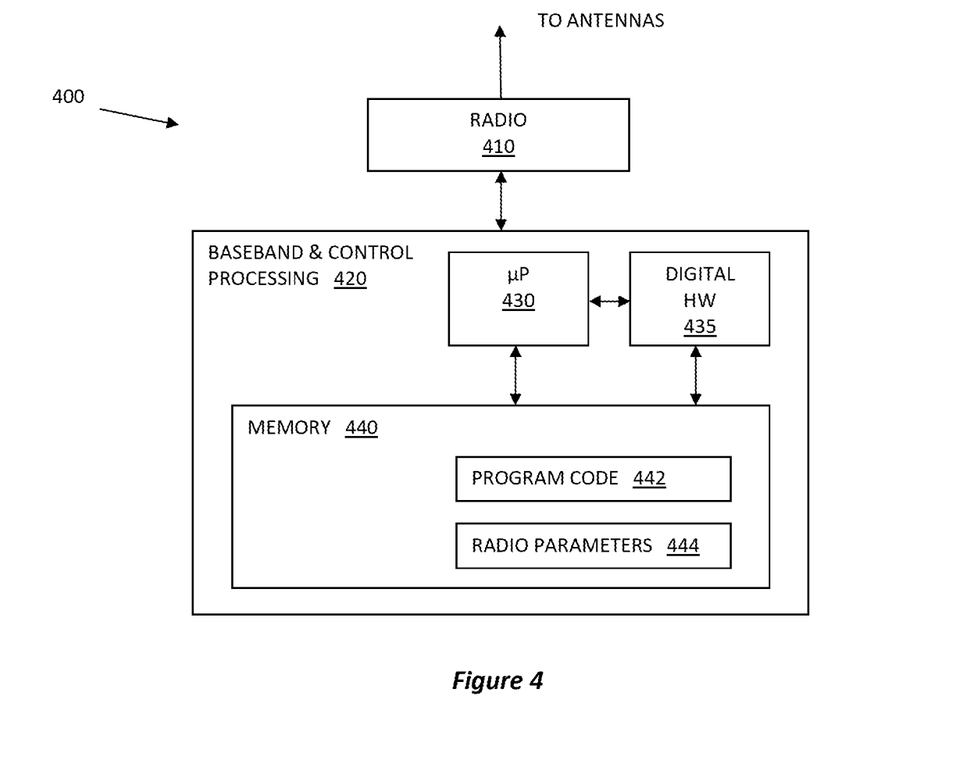
FIG. 4 is a block diagram illustrating an example network node configured according to some embodiments of the present invention.

FIG. 4 is a block diagram illustrating some components of a base station 400, illustrating a few of the components relevant to the present techniques. The pictured apparatus includes radio circuitry 410 and baseband & control processing circuit 420. Radio circuitry 410 is connected to the antennas of two or more transmission points that may be coordinated for a transmission to a given UE, and includes receiver circuits and transmitter circuits that use known radio processing and signal processing components and techniques, typically according to a particular telecommunications standard such as the 3GPP standard for LTE and/or LTE-Advanced. As mentioned above, it will be appreciated that portions of radio circuitry 410 may be distributed among several different physical units, in some embodiments, supporting corresponding distinct transmission points. Because the various details and engineering tradeoffs associated with the design and implementation of such circuitry are well known and are unnecessary to a full understanding of the invention, additional details are not shown here.

Baseband & control processing circuit 420 includes one or more microprocessors or microcontrollers 430, as well as other digital hardware 435, which may include digital signal processors (DSPs), special-purpose digital logic, and the like. Either or both of microprocessor(s) 430 and digital hardware may be configured to execute program code 442 stored in memory 440, along with radio parameters 444. Again, because the various details and engineering tradeoffs associated with the design of baseband processing circuitry for wireless base stations are well known and are unnecessary to a full understanding of the invention, additional details are not shown here.

Not shown in FIG. 4, but included in several embodiments of the invention, is a network interface circuit configured for communication with other nodes in the wireless network. In LTE eNodeBs, in particular, this network interface circuit is configured to communicate with other eNodeB's using the X2 interface defined by 3GPP specifications, as well as with one or more Mobility Management Entities (MMES) using 3GPP's S1 interface.

The program code 442 stored in memory circuit 440, which may comprise one or several types of memory such as read-only memory (ROM), random-access memory, cache memory, flash memory devices, optical storage devices, etc., includes program instructions for executing one or more telecommunications and/or data communications protocols, as well as instructions for carrying out one or more of the techniques described herein, in several embodiments. Radio parameters 444 include various predetermined configuration parameters as well as parameters determined from system measurements, such as channel measurements, and may include, for example, information defining CoMP clusters, orthogonal sequences or other parameters used for inducing incoherent combining of signals transmitted from different transmission points and/or different PRG groups, and the like.

Accordingly, in various embodiments of the invention, processing circuits, such as the baseband & control processing circuits 420 of FIG. 4, are configured to carry out one or more of the techniques described above for inducing frequency selectivity among coordinated transmission points and/or performing link adaptation based on the resulting assumption that transmissions from the coordinated transmission points will combine incoherently at the targeted UE. In some cases, these processing circuits are configured with appropriate program code, stored in one or more suitable memory devices, to implement one or more of the techniques described herein. Of course, it will be appreciated that not all of the steps of these techniques are necessarily performed in a single microprocessor or even in a single module.

Figure 5:
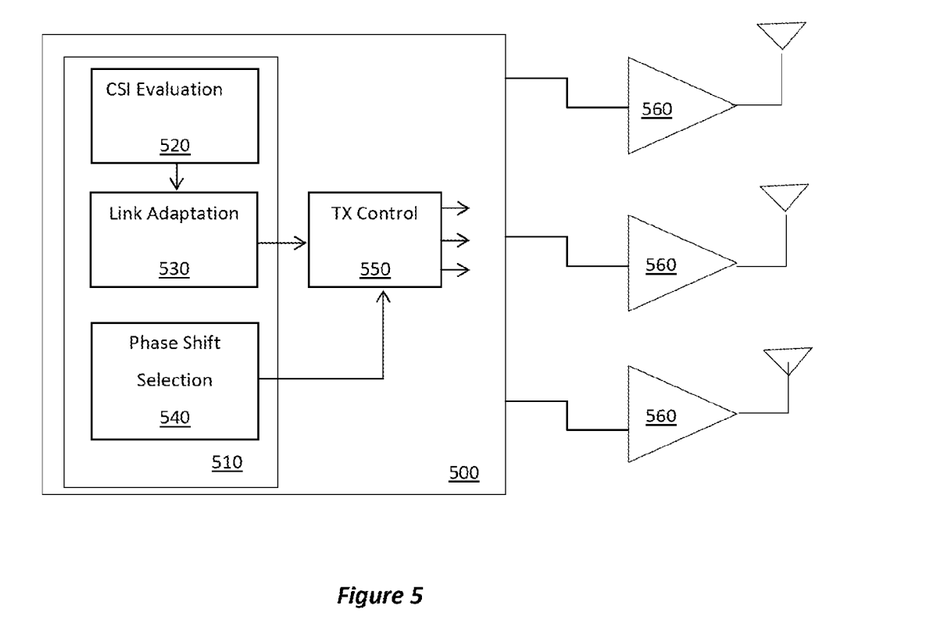
FIG. 5 is another block diagram illustrating an example network node configured according to some embodiments of the present invention.

FIG. 5 is another block diagram, this one presenting a functional view of a fixed network node 500 according to some embodiments of the present invention. Fixed network node 500, which may be an eNodeB, for example, includes a processing unit 510 and a transmitter control unit 550; either or both of these functions may correspond to the baseband and control processing circuit 420 shown in FIG. 4, in some embodiments. Processing function 510 includes a CSI evaluation unit that is configured to acquire channel state information for each of a plurality of transmission points from a UE, as well as a link adaptation unit that is configured to determine transmission parameters for a joint transmission from the plurality of transmission points to the UE, based on an assumption of non-coherent combining of signals at the user equipment. Processing function 510 further includes a phase shift selection unit 540, which determines a set or sequence of phase shifts to be used to induce frequency selectivity to transmitted data signals on a per-transmission point basis. These phase shifts are provided to the transmitter control unit 550, which is configured to transmit data signals from each of the plurality of transmission points to the user equipment, using the phase shifts, so that the transmitting includes the application of an induced frequency selectivity to the transmitted data signals on a per-transmission-point basis Thus, in various embodiments of the invention, fixed network node 500 is configured to carry out one or more of the techniques described above for inducing frequency selectivity among coordinated transmission points and/or performing link adaptation based on the resulting assumption that transmissions from the coordinated transmission points will combine incoherently at the targeted UE. In some cases, one or more of the units illustrated in FIG. 5 are implemented using computer processing circuits that are configured with appropriate program code, stored in one or more suitable memory devices, to implement one or more of the techniques described herein. Again, of course, it will be appreciated that not all of the steps of these techniques are necessarily performed in a single microprocessor or even in a single module.

As noted earlier, LTE has adopted an implicit channel state information feedback mechanism which corresponds to a CQI/PMI/RI report. What this means in practice is that the UE does not explicitly send channel information (e.g., elements of a complex valued effective channel) to the network, but instead recommends a certain transmission configuration that is well matched to the channel. Thus, as noted above, a reported CQI is a recommended transport block size (e.g., code rate) for an assumed transmission to the UE. Hence, in order to recommend a CQI there must be a "contract" between the UE and an eNodeB fully specifying how the transmission should be done. For example, in transmission mode 3 (open-loop precoding) as specified in Release 8 of the 3GPP specifications, the CQI reporting assumes a special precoder cycling that is fully specified, whereas in transmission mode 4 the UE also recommends a RI and PMI, and the CQI reporting assumes a transmission following the RI/PMI recommendation.

For Release 11 of LTE, 3GPP is specifying CoMP transmissions from multiple transmission points. Hence, to recommend a CQI for a joint transmission originating from multiple points the UE and eNodeB must have a contract (standardized) that specifies the exact downlink transmission the CQI is applicable for. According to one aspect of the present invention, the UE recommends an aggregate CQI, assuming that the transmission is transmitted incoherently between transmission points, e.g., according to one or more of the techniques described above.

Figure 6:
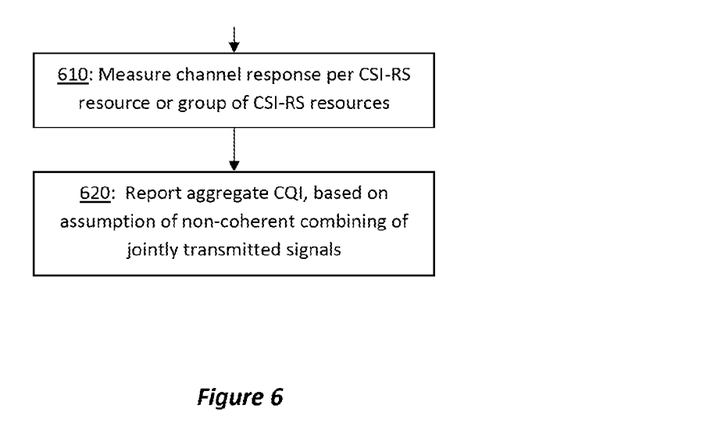
FIG. 6 is a process flow diagram illustrating an example procedure of a user equipment reporting an aggregate channel quality indicator(s) CQI.

The general procedure carried out by such a UE is shown in FIG. 6. As shown at block the UE first measures a separate channel response for each of two or more reference signals or groups of reference signals. These reference signals are CSI-RS, in some cases. Each reference signal or group of reference signals will usually, but does not necessarily, correspond to a transmission point. The illustrated method continues, as shown at block 620, with the reporting of at least one aggregated CQI, based on the measured channel responses and based on an assumption that jointly transmitted signals corresponding to the measured channel responses will combine in a non-coherent fashion at the user equipment.

Moreover, this assumption at the UE can be combined with a procedure in which the UE recommends a separate PMI for each transmission point (more specifically, for each CSI-RS resource of the CoMP Measurement Set), and assumes for the CSI report that the jointly transmitted signal is transmitted using the per-TP PMIs, but is transmitted incoherently between transmission points.

In some cases, the aggregated CQI can be determined by the UE based on an assumption that one or more known sequences of phase shifts are to be applied to corresponding ones of the jointly transmitted signals. The UE may be pre-programmed with information identifying the phase shift sequences to use, for example. The phase shifts for the one or more known sequences of phase shifts may be based on Discrete Fourier Transform rotations, in some embodiments. Of course, the signals that are ultimately transmitted need not necessarily be modified in accordance with the assumed phase shifts. Nevertheless, the reported CQI reflects a shared assumption that can be used by the network to properly evaluate the meaning of the reported CQI and to determine an effective transmission scheme.

Thus, according to some embodiments according to this related aspect of the invention, a UE is adapted to adjust its CSI reporting procedure based on whether it can "assume" that the multiple transmission points involved in a subsequent joint transmission transmit the desired signal so that the transmissions will combine incoherently at the UE, e.g., according to one of the techniques described above. In some cases this assumption that the transmissions will be transmitted in an incoherent fashion is based on a predetermined "contract," or shared understanding, between the UE and the eNodeB. This contract may be based on, for example, a standardized assumption that CSI reporting for one or more transmission modes or other operating modes for the UE should be based on incoherent transmission between TPs (more specifically effective channels of associated CSI-RSs) by the network. In other cases, explicit or implicit signaling transmitted to the UE triggers a mode wherein subsequent CSI reporting is based on the assumption of incoherent transmission.

In a variation of this approach, the eNodeB can configure (or there can be a predetermined contract) that a specific pattern of frequency selective relative phase shifts (which could be static, or fully or partially pseudo random) should be applied to the transmissions between two or more effective channels between the network and the UE. Accordingly, some embodiments of the UE discussed above may be configured to base CQI reporting on a predetermined shared understanding that a particular pattern of frequency selective relative phase shifts are applied to transmissions from two or more transmission points for which the UE is performing CSI reporting.

It will be appreciated that a UE according to these aspects of the invention may have a structure that is generally similar to the base station 400 illustrated in FIG. 4, with the individual components adapted in terms of size, performance, and specific operation according to well known aspects of mobile terminal design. Accordingly, while the size, weight, and specific performance requirements will vary, a UE according to the invention will generally comprise radio circuitry and baseband & control processing circuitry, where the radio circuitry is connected to one or more antennas and includes receiver circuits and transmitter circuits that use known radio processing and signal processing components and techniques, typically according to a particular telecommunications standard such as the 3GPP standard for LTE and/or LTE-Advanced. Because the various details and engineering trade-offs associated with the design and implementation of such circuitry are well known and are unnecessary to a full understanding of the invention, additional details are not shown here.

Likewise, a UE according to several embodiments of the present invention includes a baseband & control processing circuit that includes one or more microprocessors or microcontrollers, as well as other digital hardware, which may include digital signal processors (DSPs), special-purpose digital logic, and the like. The baseband & control processing circuit of the UE is configured to execute program code stored in memory, along with radio parameters, including program instructions for carrying out CSI reporting according to one or several of the techniques described above. Again, because the various details and engineering tradeoffs associated with the design of baseband processing circuitry for wireless base stations are well known and are unnecessary to a full understanding of the invention, additional details are not shown here.

Examples of several embodiments of the present invention have been described in detail above, with reference to the attached illustrations of specific embodiments. Because it is not possible, of course, to describe every conceivable combination of components or techniques, those skilled in the art will appreciate that the present invention can be implemented in other ways than those specifically set forth herein, without departing from essential characteristics of the invention. Modifications and other embodiments of the disclosed invention(s) will come to mind to one skilled in the art having the benefit of the teachings presented in the foregoing descriptions and the associated drawings. Therefore, it is to be understood that the invention(s) is/are not to be limited to the specific embodiments disclosed and that modifications and other embodiments are intended to be included within the scope of this disclosure. Although specific terms may be employed herein, they are used in a generic and descriptive sense only and not for purposes of limitation. The present embodiments are thus to be considered in all respects as illustrative and not restrictive.

What is claimed is:

1. A method, in a user equipment, for reporting channel state information (CSI), the method comprising:
measuring a separate channel response for each of two or more reference signals or groups of reference signals; and
reporting at least one aggregated channel quality indicator (CQI), based on the measured channel responses and based on an assumption that jointly transmitted signals corresponding to the measured channel responses will, on a per-channel response basis, combine in a non-coherent fashion at the user equipment (UE),
wherein, the UE is configured to base the CQI reporting on a predetermined shared understanding between the UE and an evolved Node B (eNB) that a predefined pattern of frequency selective relative phase shifts are applied to transmissions from two or more transmission points for which the UE is performing CSI reporting, wherein the two or more transmission points perform joint transmission and wherein the frequency selective relative phase shifts force the signals from two or more transmission points to combine in a non-coherent fashion at the UE.

2. The method of claim 1, wherein the at least one aggregated CQI is reported on a per-subband basis for two or more frequency subbands.

3. The method of claim 1, wherein the at least one aggregated CQI is a single aggregated CQI corresponding to an entire link bandwidth.

4. The method of claim 1, wherein each aggregated CQI indicates a recommended transport block size.

5. The method of claim 1, the method further comprising reporting a recommended precoder matrix indicator (PMI) for each of the measured channel responses, wherein the at least one reported aggregated CQI is further based on the recommended PMI.

6. The method of claim 1, wherein the phase shifts for the one or more known sequences of phase shifts are based on Discrete Fourier Transform rotations.

7. A user equipment configured for operation in a wireless network, the user equipment comprising
a radio circuit configured to receive reference signals, or groups of reference signals, and to transmit channel state information to the wireless network, and a baseband processor configured to:
measure a separate channel response for each of two or more reference signals or groups of reference signals, and report at least one aggregated channel quality indicator (CQI) using the radio circuit, wherein the at least one aggregated CQI is based on the measured channel responses and is based on an assumption that jointly transmitted signals corresponding to the measured channel responses will, on a per-channel response basis, combine in a non-coherent fashion at the user equipment (UE);

wherein, the UE is configured to base the CQI reporting on a predetermined shared understanding between the UE and an evolved Node B (eNB) that a particular pattern of frequency selective relative phase shifts are applied to transmissions from two or more transmission points for which the UE is performing CSI reporting, wherein the two or more transmission points perform joint transmission and wherein the frequency selective relative phase shifts force the signals from two or more transmission points to combine in a non-coherent fashion at the UE.

8. The user equipment of claim 7, wherein the baseband processor is configured to report the at least one aggregated CQI on a per-subband basis for two or more frequency subbands.

9. The user equipment of claim 7, wherein the baseband processor is configured to report the at least one aggregated CQI as a single aggregated CQI corresponding to an entire link bandwidth.

10. The user equipment of claim 7, wherein each aggregated CQI indicates a recommended transport block size.

11. The user equipment of claim 7, wherein the baseband processor is further configured to report a recommended precoder matrix indicator (PMI) for each of the measured channel responses, via the radio circuit, wherein the at least one reported aggregated CQI is further based on the recommended PMI.

12. The user equipment of claim 7, wherein the phase shifts for the one or more known sequences of phase shifts are based on Discrete Fourier Transform rotations.

* * * * *